Jan. 31, 1933.  C. C. CAPSHAW  1,895,970
WINDSHIELD ATTACHMENT
Filed Dec. 12, 1930
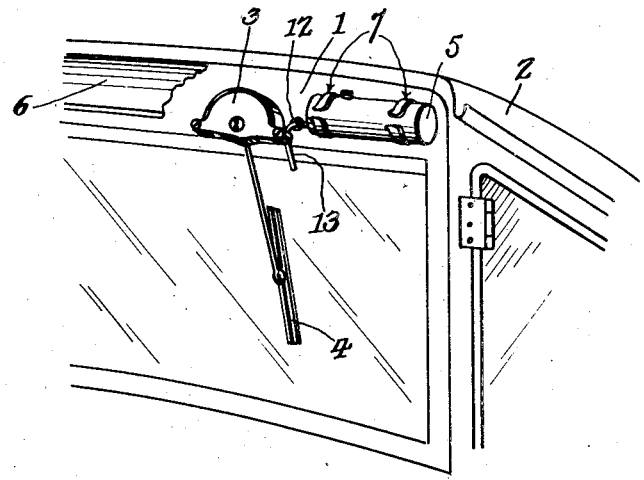
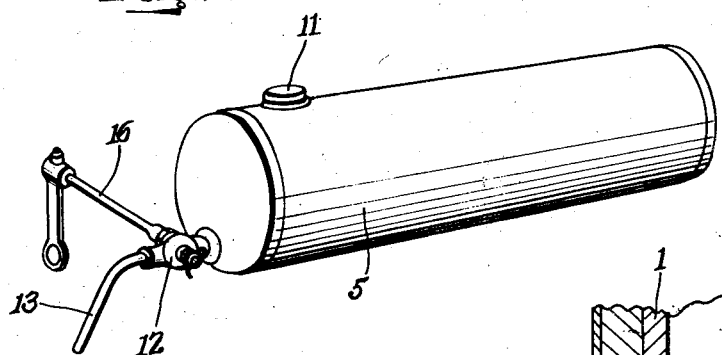
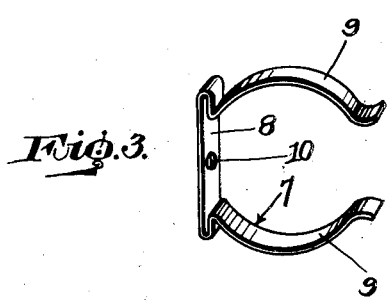
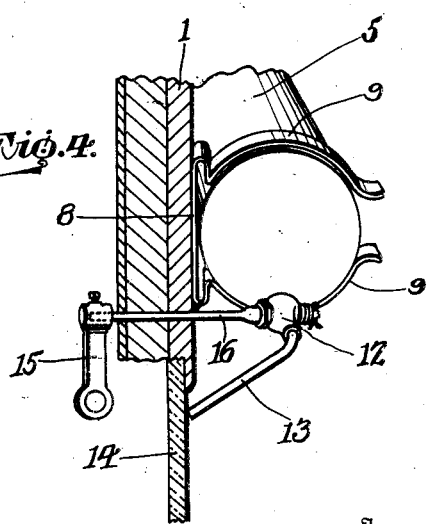
Inventor
Clyde C. Capshaw
By Geo. P. Kimmel
Attorney Patented Jan. 31, 1933

1,895,970

UNITED STATES PATENT OFFICE

CLYDE C. CAPSHAW, OF DALLAS, TEXAS

WINDSHIELD ATTACHMENT

Application filed December 12, 1930. Serial No. 501,986.

This invention relates to a windshield attachment and has for its primary object to provide, in a manner as hereinafter set forth, a gravity feed attachment adapted to be secured to the windshield frame of a motor vehicle for coaction with a conventional windshield wiper to prevent accumulation of ice, snow, mist, dust, mud splashes and the like, on the windshield.

A further object of the invention is to provide an attachment of the character aforesaid including a container adapted to be detachably secured to the outer face of a windshield frame and further including a valve for the container which is operable from the interior of the vehicle with which the attachment is associated.

With the foregoing and other objects in view, the invention consists of the novel construction, combination and arrangement of parts as hereinafter more particularly described, and as illustrated in the accompanying drawing wherein is shown an embodiment of the invention, but it is to be understood that the description and drawing are to be taken as illustrative, and that the invention is intended to be limited only by the scope of the claims hereunto appended.

In the accompanying drawing in which like numerals are employed to designate like parts throughout the several views:

Figure 1 is a fragmentary perspective view of a vehicle body showing my attachment associated therewith.

Figure 2 is an enlarged perspective view of the container and connected parts.

Figure 3 is an enlarged perspective view of one of the clamping elements for securing the container in position.

Figure 4 is an enlarged fragmentary section through a windshield and frame, showing the attachment in perspective.

Referring to the drawing in detail, the numeral 1 indicates the windshield frame of a vehicle body shown conventionally at 2, the frame 1 being provided with a windshield wiper 3 which may be of any well known construction and which includes the usual wiper element 4.

My attachment includes a container 5 which is secured to the outer face of the frame 1, beneath the sun vizor 6 of the vehicle, by means of a pair of clamping elements indicated generally at 7. Each of the clamping elements 7 includes a flat, rigid central portion 8, and a pair of arcuate, resilient end portions 9. The rigid portion 8 is provided centrally thereof with an aperture 10 for the passage therethrough of a suitable securing device, not shown, for connecting the clamping element to the windshield frame.

The container 5 preferably is of elongated cylindrical construction provided with a suitable filler cap 11, and when secured in position is firmly gripped between the resilient end portions 9 of the clamping elements 7. Tapped into one end of the container 5, adjacent the lower face of the latter, is a valve coupling 12, to which is connected a curved discharge pipe 13 having its free end disposed adjacent the outer face of the windshield 14, adjacent and just above the path of the wiper element 4. The valve coupling 12 is provided with a valve stem 16 which projects through the frame 1 into the interior of the vehicle. Detachably secured to the inner end of the valve stem 16 is a handle member 15 by the manipulation of which the valve within the coupling 12 may be opened or closed as desired.

In the use of the attachment, the handle member 15 is turned in a manner to open the valve within the coupling 12 which permits the contents of the container 5 to flow through the discharge pipe 13. The discharge pipe 13 is disposed at a downward inclination toward the windshield 14 in order that the flow from the pipe will be directed directly onto the windshield. The pipe 13 is of appropriate size to discharge the contents of the container in a relatively thin stream, which may be regulated to any speed desired by the proper setting of the handle member 15. The container 5 preferably will be filled with alcohol or any other suitable anti-freeze liquid suitable for cleaning in order that ice and the like may be prevented from forming on the windshield when the attachment is in operation, and in order that any accumulation of dust, mud or the like, may be loosened when the attachment is in operation. The liquid discharged from the pipe 13 runs down the face of the windshield 14 into the path of movement of the wiper element 4, and the latter operates to spread the liquid over the entire portion of the windshield surface which is covered by the wiper element during the operation of the latter.

It is thought that the many advantages of an attachment in accordance with this invention will be readily apparent, and although the preferred embodiment of the invention is as illustrated and described, it is to be understood that changes in the size, shape and arrangement of parts may be resorted to, so long as such changes fall within the scope of the invention as defined in the appended claims.

What I claim is:—

1. In an attachment for a windshield frame equipped with a wiper element, a liquid container, means for detachably securing the container to the outer face of the windshield frame, a valve coupling tapped into the container, a discharge pipe leading from the coupling to the windshield above the path of the wiper element, and a rearwardly extending shiftable valve stem projecting from the coupling and of a length to extend through and rearwardly from the windshield frame.

2. In an attachment for a windshield frame equipped with a wiper element, a liquid container, means for detachably securing the container to the outer face of the windshield frame, a valve coupling tapped into the container, a discharge pipe leading from the coupling to the windshield above the path of the wiper element, a valve stem projecting from the coupling, said valve stem extending through the windshield frame, and a handle member detachably secured to the valve stem inwardly of the frame.

3. In an attachment for a windshield frame equipped with a wiper element, the combination of a pair of supporting elements projecting forwardly from and adapted to be anchored to the top of the windshield frame, a liquid container removably mounted in said elements, a valve coupling tapped in one end of the container, a curved and downwardly inclined discharge pipe fitted in and extended from said coupling and adapted to be arranged above the path of the wiper element, a rearwardly extending valve stem for passage through said top, and a handle carried by the rear end of the stem for operating the latter to control discharge from the container.

4. In an attachment for a windshield frame equipped with a wiper element, a liquid container, means for detachably securing the container to the outer face of the top of the windshield frame, a valve coupling tapped directly into one end of the container, a discharge pipe secured at one end in said coupling and arranged to discharge in the path of the wiper element, and a rearwardly extending actuatable valve stem of a length to extend through said top to within reach rearwardly of said top.

In testimony whereof, I affix my signature hereto.

CLYDE C. CAPSHAW.